United States Patent [19]

Eastcott et al.

[11] Patent Number: 4,491,767
[45] Date of Patent: Jan. 1, 1985

[54] SYNCHRONIZING SYNCHRONOUS MOTORS, MOTORS PRIOR TO CLUTCH CLOSURE

[75] Inventors: Peter D. Eastcott; Ronald C. Trussler, both of Peterborough, Canada

[73] Assignee: Canadian General Electric Company Limited, Toronto, Canada

[21] Appl. No.: 562,527

[22] Filed: Dec. 19, 1983

Related U.S. Application Data

[63] Continuation-in-part of Ser. No. 448,338, Dec. 9, 1982, abandoned.

[51] Int. Cl.³ .............................................. H02P 5/46
[52] U.S. Cl. ........................................ 318/85; 318/5; 318/53; 318/59; 318/66; 241/101.2
[58] Field of Search .................... 318/85, 5, 66, 53, 59

[56] References Cited

U.S. PATENT DOCUMENTS

| | | | |
|---|---|---|---|
| 3,557,686 | 1/1971 | Sapolsky | 318/85 X |
| 3,557,692 | 1/1971 | Lee | 318/85 X |
| 3,742,321 | 6/1973 | Bergman et al. | 318/99 |
| 3,991,349 | 11/1976 | Watson et al. | 318/100 X |
| 3,991,350 | 11/1976 | Miyagoshi | 318/74 X |
| 4,042,128 | 8/1977 | Shrader | 414/287 |

FOREIGN PATENT DOCUMENTS

| | | | |
|---|---|---|---|
| 896081 | 3/1972 | Canada | 318/98 |
| 1420697 | 1/1976 | United Kingdom | 318/98 |

OTHER PUBLICATIONS

General Electric Technical Information, GET-1722C "Spotting Equipment for Synchronous Motors", General Electric Co., Nov. 1966.
D. D. Stephen, "Synchronous Motors and Condensers" Chapman & Hall Ltd., London, England 1958.

*Primary Examiner*—J. V. Truhe
*Assistant Examiner*—Bentsu Ro
*Attorney, Agent, or Firm*—Raymond A. Eckersley

[57] ABSTRACT

In the inching of a grinding mill or similar apparatus which is driven by a pair of synchronous motors through fluid actuated clutches, the motors must be angularly alined one with the other in order that the load be shared equally between the motors. The apparatus of the invention connects the field supply to both motor fields and then it connects a zero frequency supply (i.e. a DC supply) to the stator windings of both motors and ramps up or increases the amplitude of the supply. This brings the rotors into alinement without undue oscillation. When the amplitude of the low frequency supply reaches a predetermined level, the clutches are closed or locked and the motors are connected to the load with the rotors in angular coincidence or alinement.

3 Claims, 1 Drawing Figure

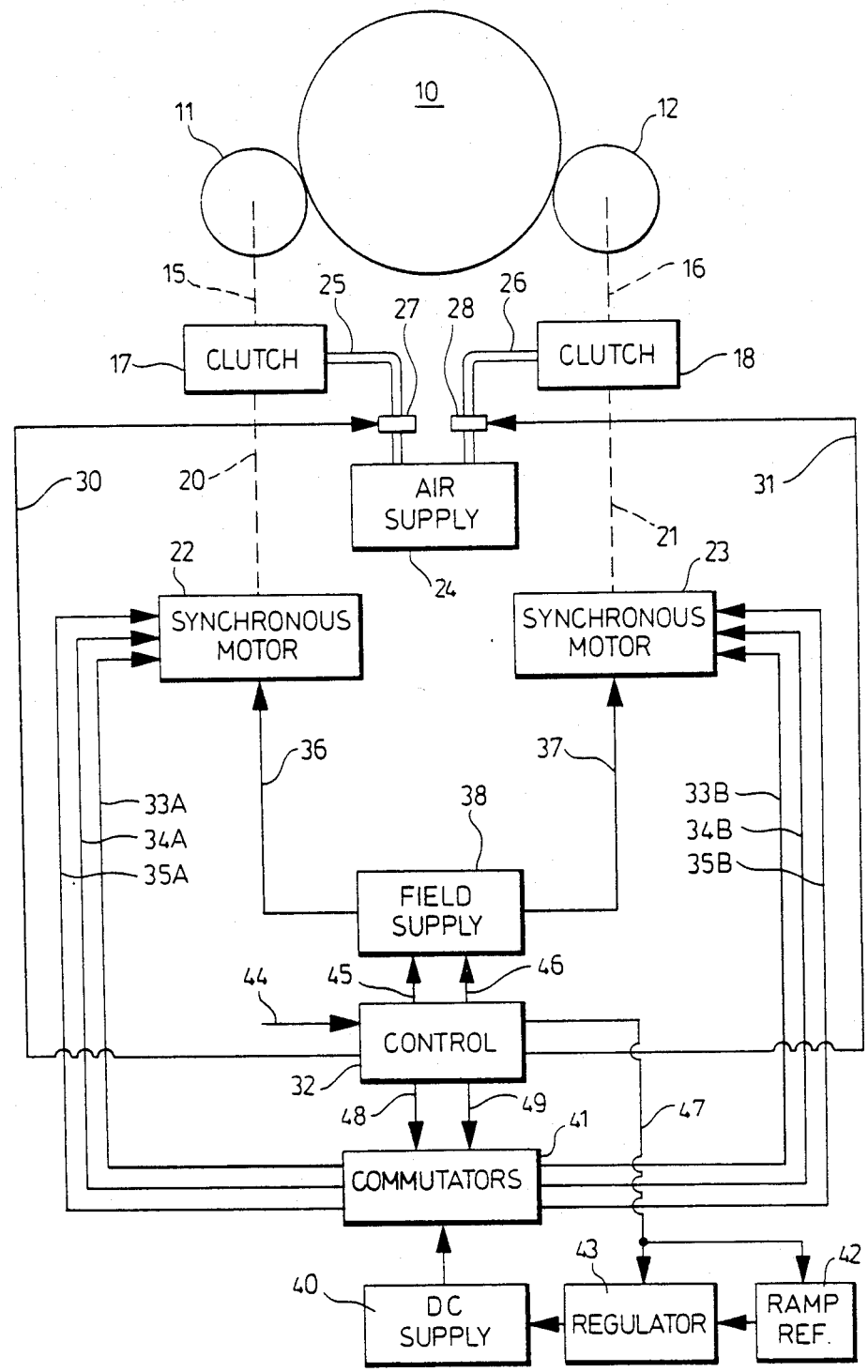

SYNCHRONIZING SYNCHRONOUS MOTORS, MOTORS PRIOR TO CLUTCH CLOSURE

CROSS-REFERENCE

This is a continuation-in-part of application Ser. No. 448,338 filed Dec. 9, 1982 now abandoned.

FIELD OF THE INVENTION

The present invention relates to a drive system where two or more synchronous motors are coupled through clutches to drive a common load, and in particular it relates to a method and apparatus for bringing the synchronous motors into angular coincidence prior to closing or locking the clutches such that if they are then locked together they will exactly share a common mechanical load when the load is applied.

BACKGROUND OF THE INVENTION

The invention may be conveniently used to prepare for the slow rotation or "inching" of a grinding mill and will be described with reference to such a mill.

A charge or load in a grinding mill may become frozen as a result of a stoppage or shut down of the mill. It is common practice to inch the mill, that is, to rotate the mill very slowly, to slowly tilt the mill charge and permit it to cascade or tumble. This prevents a lumped or frozen charge from being rotated to a top position within the mill and having it instantaneously fall to the bottom with disastrous results. When the mill is inched, the rotation or inching can be stopped if the charge does not cascade before a certain point is reached.

It is convenient to inch the mill electricially, that is, to apply a low frequency alternating current to the stators of the synchronous motors with the rotor field windings excited normally from a DC (direct current) supply. The low frequency might be, for example, of the order of one cycle per second. With the clutches closed or locked, this will provide a slow rotation of the mill provided that the motors are in precise angular coincidence. If they are not in precise angular coincidence, a destructive hammering of any associated gearing will result.

The low frequency alternating current is often provided from a DC source through contactors which close and open in a predetermined sequence to provide a simulated or artificially synthesized alternating current which increases and decreases in discrete steps as the contactors operate. Other forms for an alternating current power source might, of course, be acceptable. However, the step-type alternating supply obtained by using contactors and a DC source is relatively inexpensive and adequate for the purpose of inching. One such source of alternating current could provide inching power for shared use between several grinding mills at one location as inching is not required very frequently.

The placing of synchronous motors in angular coincidence has sometimes been referred to as "synchronizing" the motors for load sharing. However, because the "synchronizing" of synchronous motors has another meaning in the art, this description will refer to the angular coincidence or angular alinement of synchronous motors for load sharing.

When electric inching is required, it is essential that the two (or more) synchronous motors which drive the mill be in angular coincidence with one another before load is applied. In other words, it is very desirable that the synchronous motors, at each instant, when energized from the same electrical supply, should have exactly the same load angle, that is, have the same angular coincidence so that load is equally shared. Thus, the angular coincidence will ensure load sharing between the motors under steady state and transient conditions. Otherwise, if the rotors are coupled to the common load with a small difference in angular coincidence with respect to the rotating field, there will not be load sharing. A very small difference in load angle measured at the clutches may represent a large difference in motor load, and result in destructive rattling of the mill gear train during the inching operation.

In the past where more than one synchronous motor was used on a mill drive, these were permanently coupled to the gear train in the correct electrical and mechanical relationship during installation. The coupling means was not readily adjustable during the operation of the mill and required many hours of down time to make a mechanical correction. It was found that during the inching operation relatively small errors in machine load angle would cause destructive rattling of the mill gear train because the machines were continuously transferring load torque between one another. It will be apparent that if the machines are to be connected to the gear train or mill through friction clutches, which offer no predetermined angular relationship, it will be impossible to achieve satisfactory performance.

The present invention provides for achieving the necessary precision of angular coincidence or alinement of the synchronous motors prior to inching. The rotor field DC excitation is applied to the plurality of stationary motors. The inching contactors are closed at a predetermined point in their sequence, and the DC voltage supply which provides a DC voltage source for the contactors is ramped up or increased to a predetermined level. As the DC voltage is increased, the resulting stator current develops an alining torque unless the excited field poles of each motor are exactly alined with the stator magnetizing flux. Thus the rotors rotate until precise angular coincidence or alinement is achieved before the clutches are closed. The clutches are then closed and mechanically locked and the commutating sequence of the contactors initiated to start inching. Because the rotors were positioned before the clutches were closed, and because the inching started from this common rotor position, the motors share the load with precision.

OBJECTS AND SUMMARY OF THE INVENTION

It is therefore an object of the present invention to provide apparatus for placing two or more synchronous motors in precise angular coincidence prior to clutch closure for inching a common load.

It is another object of the invention to provide a method for placing two or more synchronous motors in precise angular coincidence prior to clutch closure for inching a common load.

In accordance with the invention there is provided apparatus for achieving angular coincidence between two or more synchronous motors, each having a stator winding and a rotor field winding and each coupled through a respective friction clutch to a common load, prior to closure of the clutches, comprising a field supply connected to each field winding to provide field excitation to said motors, means providing a source of DC voltage and for applying said DC voltage to the stator winding of each said motor, and control means for controlling said means providing a source of DC voltage a to apply a predetermined level of said voltage to said stator windings prior to closing said clutches.

Also in accordance with the invention there is provided a method for achieving angular coincidence of at least two synchronous motors each coupled through a respective clutch to drive a common load, comprising the steps of releasing the clutches to uncouple the motors from the load, applying a field excitation current to the motors, providing a low frequency alternating current source for the motor stator windings with an initial frequency of zero, increasing the amplitude of said low frequency alternating current source for the motor stator windings from a low level to a predetermined operating level to brining the motors into angular coincidence, and closing the clutches to couple the motors to the load.

BRIEF DESCRIPTION OF THE DRAWING

The invention will be described in more detail with reference to the accompanying drawing in which the single FIGURE is a simplified schematic diagram of the circuitry and drive for a grinding mill, in accordance with the invention.

DESCRIPTION OF THE PREFERRED EMBODIMENTS

Referring to the drawing, a grinding mill is represented schematically at 10. A large ring gear is attached to the periphery of the grinding mill and this is driven by pinions or driving gears 11 and 12 also shown schematically. The teeth of gears 11 and 12 are in continuous engagement with the ring gear of the grinding mill. Two shafts 15 and 16 respectively connect driving gears 11 and 12 through fluid actuated dry clutches 17 and 18 to shafts 20 and 21 of synchronous motors 22 and 23. The clutches 17 and 18 are conveniently air operated clutches supplied with air from an air supply 24 along piping 25 and 26 through air pressure control valves 27 and 28. The air is frequently conducted to the clutches through a central bore in the motor shaft. The air valves 27 and 28 are respectively controlled by electrical signals via conductors 30 and 31 from control 32.

The synchronous motors 22 and 23 receive power from a polyphase inching bus represented by conductors 33A, 34A, 35A and 33B, 34B and 35B respectively. The synchronous motors 22 and 23 have their respective field windings connected by conductors 36 and 37 to a DC field supply 38.

The inching bus (conductors 33, 34 and 35) receive power from a DC supply 40 which may be a rectifier receiving power from a normal AC source. The output from DC supply 40 may be changed to a stepped low frequency power source by commutating contactors 41. Such switching arrangements are known and may comprise mechanical contactors or solid state switches. Technical Information Bulletin GET-1722B entitled "Spotting Equipment for Synchronous Motors" by E. A. E. Rich, published November 1966 by the General Electric Company describes a system for providing a stepped waveform for use in inching or spotting synchronous motors where commutating contactors are used to obtain a synthesized stepped AC waveform from a DC supply. Thus, the output from the commutating means 41 is on conductors 33, 34 and 35 and is a three phase low frequency supply. The waveform is a stepped approximation of a sinusoidal waveform.

A ramp reference 42 provides a ramp-like signal to regulator 43 which in turn regulates the DC power source 40 to increase, when required, in accordance with the ramp reference signal.

The control 32 controls the procedure for bringing the motors into angular coincidence or alinement and may also subsequently control the inching procedure. It should be noted that the present invention is primarily concerned with obtaining angular coincidence. Once the motors are placed in angular coincidence, the clutches can be closed or engaged and inching (or spotting) proceeds in the usual manner. The procedure is initiated by a signal at input 44. When the procedure is initiated, a signal on conductors 45, 46 causes field supply 38 to provide a DC excitation current over conductors 36 and 37. Control 32 provides a signal on conductor 47 which starts the ramp reference 42 and regulator 43. The regulator 43 slowly increases or ramps up the DC output from DC supply 40 and this DC output is applied to commutating means 41. A signal from control 32 on conductors 48, 49 is applied to commutating means 41 which sets this device 41 at a predetermined point in its sequence. Because device 41 then remains at this point it will provide only DC voltage on the inching bus. Thus, the commutating means 41 provides on the inching bus (which comprises conductors 33A, 34A, 35A and 33B, 34B, 35B) a slowly increasing direct current voltage to the stator windings of synchronous motors 22 and 23. In other words, the voltage on the inching bus is initially a DC voltage, i.e. it is at zero frequency. The clutches 17 and 18 are unclutched or open and the rotors of synchronous motors 22 and 23 are free to seek positions of angular coincidence with equal load angles. Because the voltage was increased slowly, the rotors are moved to this position of angular coincidence without undue mechanical oscillation. When the voltage from commutating means 41 reaches a predetermined level, or at a predetermined time after the procedure is initiated, a signal from control 32 on conductors 30 and 31 operates valves 27 and 28 to apply air to the clutches 17 and 18 causing the clutches to close or lock. The low frequency alternating current in the inching bus is kept initially at zero frequency (i.e. DC) to ensure the rotors are stationary when the clutches are closed. While it might be possible to obtain angular coincidence using a stepped synthesized AC waveform at a low frequency, there is certainly a chance that the clutches might close when the motors were moving and result in improper angular coincidence or alinement. Consequently it is preferred to achieve angular coincidence using DC on the stator windings. Once the clutches are locked the control 32 then applies a signal over conductors 48 and 49 to commutating contactor means 41 to start the commutating sequence for inching. As the motors were in angular coincidence prior to clutch closure and prior to starting of the inching procedure, the load will be shared evenly by motors 22 and 23 at all times.

What is claimed as new and desired to be secured by Letters Patent of the United States is:

1. Apparatus for achieving angular coincidence between two or more synchronous motors, each motor having a stator winding and a rotor field winding and each motor being coupled through a respective fluid-actuated friction clutch to a common load, prior to closure of said clutches, comprising a source of fluid pressure connected through a respective control valve to a respective fluid-actuated clutch, a field supply connected to each field winding to provide field excitation to each said motor, a source of controllable DC voltage and means for applying said source of controllable DC voltage to said stator windings, regulator means connected to said source of controllable DC voltage to control the DC voltage therefrom from a low level up to a predetermined operating level to cause the voltages applied to said stator windings to slowly increase in amplitude up to a predetermined operating voltage, and control means having a first output connected to said regulator means to initiate the slow increase in amplitude of the DC voltage applied to the stator windings up to said predetermined operating voltage to bring into angular coincidence the uncoupled rotors of said motors, and a second output connected to said control valves to open said valves and actuate said clutches to their closed positions after the rotors of said motors are in angular coincidence.

2. Apparatus as defined in claim 1 in which said means connected to said controllable source of DC voltage and to the stator winding of each said motor is a commutating contactor means comprising a plurality of switches operable in a predetermined sequence.

3. Apparatus for achieving angular coincidence between a first and a second synchronous motor, each said synchronous motor having a stator winding and a rotor field winding and each being coupled through a respective first and second fluid-actuated friction clutch to a common load, prior to closure of said clutches, comprising a source of fluid pressure connected through a first and second control valve respectively to said first and second clutches, a field supply connected to the field winding of each said first and second motor to provide field excitation to each said motor, controllable rectifier means connected to a source of AC voltage to provide a source of controlled DC voltage, commutating contactor means having an input connected to said rectifier means to receive therefrom a controllable DC voltage and to provide at an output thereof a low frequency alternating voltage having a zero frequency as a lower limit and whose amplitude varies as said DC voltage, means connecting the output of said commutating contactor means to the stator winding of each said first and second motor to apply thereto said low frequency alternating voltage initially at a zero frequency, regulator means connected to said controllable rectifier means and responsive to a ramp signal to increase the output of said rectifier means up to a predetermined level causing the amplitude of said zero frequency alternating voltage to increase to a predetermined operating voltage, and control means having a first output connected to said regulator means to initiate response to said ramp signal to cause said amplitude of said low frequency alternating voltage to slowly increase to said predetermined operating voltage and bring into angular coincidence the uncoupled rotors of said first and second motors, and a second output connected to said first and second control valves to open said valves and actuate said first and second clutches to their closed positions after the motors are in angular coincidence.

* * * * *